(12) United States Patent
 Techer et al.

(10) Patent No.: US 10,994,504 B2
(45) Date of Patent: May 4, 2021

(54) MOLD ASSEMBLY FOR RESIN TRANSFER MOLDING

(71) Applicant: SAFRAN AIRCRAFT ENGINES, Paris (FR)

(72) Inventors: Marc-Emmanuel Jean François Techer, Paris (FR); Nicolas Cambyse Ashtari, Paris (FR); Pauline Nathalie Six, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 884 days.

(21) Appl. No.: 15/599,061

(22) Filed: May 18, 2017

(65) Prior Publication Data

US 2017/0334152 A1   Nov. 23, 2017

(30) Foreign Application Priority Data

May 19, 2016 (FR) ..................... 1654450

(51) Int. Cl.
*B29C 70/54* (2006.01)
*B29C 70/48* (2006.01)
*B29D 99/00* (2010.01)

(52) U.S. Cl.
CPC ............ *B29C 70/541* (2013.01); *B29C 70/48* (2013.01); *B29C 70/54* (2013.01); *B29C 70/545* (2013.01); *B29D 99/0025* (2013.01)

(58) Field of Classification Search
None
See application file for complete search history.

(56) References Cited

U.S. PATENT DOCUMENTS

| 4,438,062 A | * | 3/1984 | Griffith | ............... B29C 37/0028 264/255 |
| 5,040,962 A | * | 8/1991 | Waszeciak | ............ B29C 67/246 425/112 |
| 5,141,690 A | * | 8/1992 | Marshall | ............. B29C 33/0033 264/154 |

(Continued)

FOREIGN PATENT DOCUMENTS

WO   2011/027074 A1   3/2011

OTHER PUBLICATIONS

French Search Report and Written Opinion completed Feb. 17, 2017, issued in corresponding French Application No. 1654450, filed May 19, 2016, 10 pages.

*Primary Examiner* — Jacob T Minskey
*Assistant Examiner* — Baileigh Kate Darnell
(74) *Attorney, Agent, or Firm* — Christensen O'Connor Johnson Kindness PLLC

(57) ABSTRACT

A mold assembly includes an injection mold configured to receive a woven preform. The preform has a principal direction with at least one edge extending substantially along the principal direction. The mold assembly is configured to allow the impregnation of the preform with a resin injected into the mold. The mold assembly further includes a removable longitudinal element for the injection mold, wherein said longitudinal element is configured to cooperate with the preform and conformed as a profiled member configured to be arranged in contact with the mold along at least the segment of the edge of the preform in order to prevent the pinching of free fibers extending from the edge of the preform between the two parts of the mold.

11 Claims, 3 Drawing Sheets

(56) References Cited

U.S. PATENT DOCUMENTS

| | | | | |
|---|---|---|---|---|
| 5,518,385 | A | * | 5/1996 | Graff ....................... B29C 70/48 425/127 |
| 7,081,219 | B2 | * | 7/2006 | Stewart ................. B29C 43/183 264/134 |
| 2002/0145218 | A1 | * | 10/2002 | Caldwell, Jr. ........... B29C 70/48 264/102 |
| 2003/0227107 | A1 | * | 12/2003 | Stewart ................. B29C 43/183 264/236 |
| 2007/0175575 | A1 | | 8/2007 | Rubin et al. |
| 2012/0267039 | A1 | * | 10/2012 | Dambrine ............... B29C 70/48 156/148 |
| 2016/0101575 | A1 | | 4/2016 | Ashtari et al. |

* cited by examiner

MOLD ASSEMBLY FOR RESIN TRANSFER MOLDING

BACKGROUND

The invention relates to the manufacture of components made from composite materials, more particularly, components obtained by the resin impregnation of woven preforms during an RTM method.

The RTM molding method, the acronym for the English expression Resin Transfer Molding, is a well-known manufacturing method consisting of placing a dry fabric preform in an impervious cavity of a mold conformed as a pattern, and filling this cavity with an impregnation resin, generally an epoxy resin.

The preform is generally produced by the three-dimensional weaving of composite fibers such as carbon/epoxy fibers.

During the manufacture of the preform, a raw weave is produced which is then cut to the shape of the preform to be obtained. The consequence of this cutting operation is to cause, on the edges of the preform, free and/or unmeshed fibers that extend randomly from the edges of the preform. The injection mold generally comprises a bottom part comprising a cavity that defines a part of the pattern, and a top part that can be attached to the bottom part in order to close the mold and defines the other part of the pattern. When the mold is closed, its bottom and top parts are contiguous along a joint zone.

Once the preform, which has previously been partially compacted at the end of the cutting, is placed in the cavity of the bottom part of the injection mold, the top part of the mold is closed on said bottom part and finishes the compacting of the preform at this time. The preform is then impregnated with resin during an injection operation. Such operations are described in the document US-2016-0101575-A1.

By propagating in the pattern, the resin propagates in the preform and follows the shapes of the pattern. Then the resin polymerizes and produces a final rigid component with a shape corresponding to that of the pattern. The mold is then opened and the final component is extracted.

Conventionally, the injection mold is designed so as to take account of the phenomenon of unmeshing of the preform fibers. This is because the free and/or unmeshed fibers which project from the preform may, if particular precautions are not taken, be inserted in the parting line before the mold is closed. A parting-line zone in which fibers are trapped would create an unwanted clearance between the two bottom part and top part of the mold and would enable resin to leak through the parting line, which would result in producing a defective part.

Proposing, in the vicinity of the parting line, a recess for receiving the free and/or unmeshed fibers extending from the edge of the preform is therefore known. This recess is generally produced by forming bevels facing each other on the edges of the bottom and top part of a mold. These bevels are referred to as "anti-pinch bevels".

This design does nevertheless have the drawback of providing the resin, through the presence of this recess, with a preferential path through which it can insinuate itself when it is injected into the mold.

This is because the resin, being a fluid, tends to pass round the preform and to be housed preferentially in each corner of the cavity. Because of this, at the time of injection, the resin tends to pass round the preform and to fill the mold in an irregular fashion in a so-called "pocket" impregnation that is liable to leave, in the resin, pockets where the resin is absent and which, once the resin has polymerized, produce regions of porosities that may be detrimental to the mechanical soundness of the part.

It is therefore essential to prevent free fibers being able to be trapped between the two parts of the mold, while preventing the resin dispersing in the mold by passing round the preform.

To solve this problem, it has been proposed, in the document WO-2011/027074-A1, to clad the cover of the mold and the junction of its two parts with a silicone skin. This skin is however very bulky.

It is therefore on the contrary desirable to favor a progression of the resin in the mold in the form of a propagation front advancing in a regular fashion when the resin is injected, so as to allow uniform filling of the mold as the resin progresses, so as to offer a finished part free from porosities, by means of an element with a size less than the known skin of the prior art.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DISCLOSURE OF THE INVENTION

The aim of the invention is therefore to propose a mold assembly comprising an injection mold and an element adapted to said mold allowing remedying these drawbacks.

More particularly, the aim of the invention is to propose a mold assembly comprising a mold with no anti-pinch bevels in order to prevent the resin passing round the preform, and an element allowing using said mold while preventing free or unmeshed fibers entering the parting line. To this end, the mold assembly according to the invention comprises an element configured so as to contain the fibers. Such an element also allows promoting a progression of the resin in the form of a regular propagation front, preventing it from forming pockets where the resin is absent.

For this purpose, the invention proposes a mold assembly comprising an injection mold in at least two parts, able to move between an open position in which said at least two parts are separated to allow the introduction of a preform into at least one of said parts, and a closed position in which said at least two parts are joined along a parting line to allow the impregnation of said preform with a resin injected into said mold, and then the polymerization of the resin impregnating said preform, said preform extending in a given principal direction, comprising at least one edge extending substantially along said principal direction, and said edge comprising at least one segment from which there project free fibers liable to lie in the parting line of said two parts of said mold when it occupies its closed position, and at least one longitudinal element adapted for said injection mold, wherein said element is removable, configured so as to cooperate with the preform and conformed as a profiled member, and configured so as to be arranged in contact with said mold along at least said segment of said edge of the preform in order to prevent the pinching of the free fibers of said segment of said edge of the preform between said at least two parts of said mold.

According to other features of the mold assembly:

said at least one member has an L-shaped cross section and comprises a wall that is configured so as to be placed in contact with a wall of one of the parts of the mold before it is closed and a wall that is configured so as to be arranged in contact with a facing wall of the other part of the mold when it is closed, the walls of said at least one element are configured so as to extend on either side of the edge of the preform at a minimum distance able to contain the free fibers of said segment of the edge of the preform projecting from said segment, said at least one element is configured so as to cooperate with a preform comprising at least a first part comprising said edge, intended to be removed by machining after polymerization of said preform, and at least a second part intended to form a final component, and in that the walls are configured so as to extend only facing said first part, the edge of the preform has a given profile, and a profile of said profiled member follows the profile of the edge of the preform along the entire length of said profiled member.

the mold comprises a bottom part comprising a pattern configured so as to receive the preform and comprising at least a first mold closure face, a top part configured so as to close the bottom part and comprising at least one second mold closure face able to cooperate with the first face, said first and second faces being configured so as to be arranged in contact with each other along the whole of their surfaces along said at least one parting line in the closed position of the mold, and in that said at least one removable element is configured so as to be disposed in contact with a wall of the pattern and at said parting line providing the junction of the bottom and top parts of the mold.

Finally, the invention relates to a manufacturing method for manufacturing a turbine-engine component made from composite material by the impregnation, with a resin, of a woven preform with a mold assembly as previously disclosed.

According to the invention, this manufacturing method comprises successively:

a step during which a three-dimensional weaving of fibers is carried out;

a step during which the weave is cut in order to obtain a preform corresponding to the component to be obtained, said preform comprising at least one edge, at least one segment of which comprises free fibers;

a step during which the preform is deposited in the pattern in the bottom part of the mold;

a step during which at least one removable element is deposited in contact with a wall of the pattern, along at least said segment of the edge of the preform, and at the parting line of the mold providing the junction of its bottom and top parts;

a step during which the top part of the mold is closed on the bottom part;

a step during which resin is injected into the mold;

a step of polymerization of the resin;

a step during which the preform and the at least one element trapped in the polymerized resin are extracted;

a step during which a first part of the preform containing the at least one removable element trapped in the polymerized resin is machined in order to eliminate the removable element and any excess resin in order to keep only a second part of the preform corresponding to the final component.

According to another feature of the manufacturing method, prior to the step of depositing the removable element, said removable element is chosen from a stock of removable elements so that:

a profile of the profiled member of said removable element follows the profile of the edge of the preform along the entire length of said profiled member, the walls of the profiled member of the removable element are able to extend on either side of the edge of the preform along a minimum distance able to contain the free fibers of said segment of the preform extending from said segment, the walls of the profiled member of the removable element are able to extend only in line with said first part of the preform.

DESCRIPTION OF THE DRAWINGS

The invention will be understood better and other details, features and advantages of the present invention will emerge more clearly from a reading of the following description given by way of non-limitative example and with reference to the accompanying drawings, in which.

DETAILED DESCRIPTION

Figure 1:
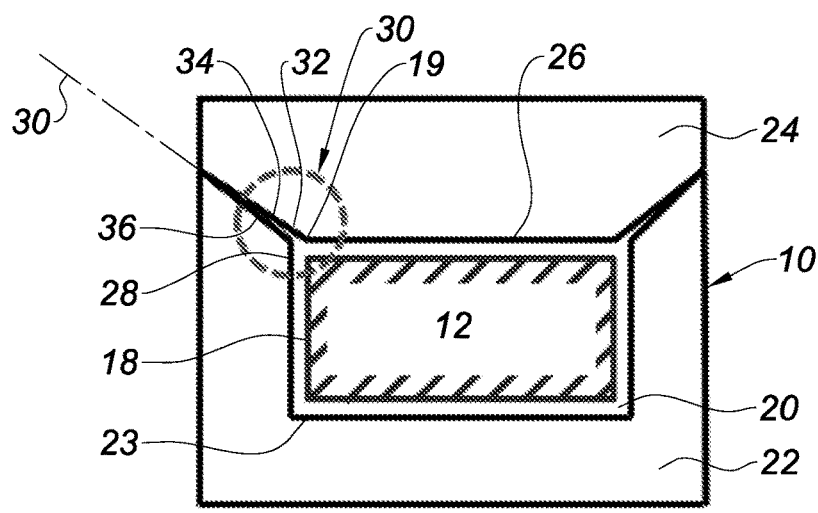
FIG. 1 is a schematic view in cross section of a mold and of a preform according to the prior art shown during a step of closure of the mold prior to the injection of resin into said mold.

In the following description, identical reference numerals designate identical parts or parts having similar functions.

FIG. 1 shows an injection mold 10 and a preform 12 of principal direction X intended to allow the production of a component made from composite material in an RTM (Resin Transfer Molding) method according to a known prior art.

Figure 4:
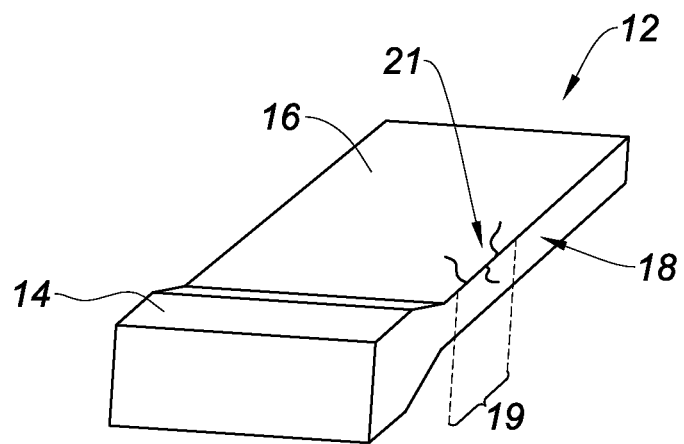
FIG. 4 is a perspective view of a preform used in the invention.

In such a method, a dry-fabric preform is used of the type shown in FIG. 4. In this figure, a preform 12 is shown intended to allow the production of a turbine-engine blade. For this reason, the preform 12 comprises a part 14 intended to form a root of the final blade, and a part 16, continuous with the part 14 that is intended to form a vane of the final blade.

The preform 12 is produced by the three-dimensional weaving of composite fibers, such as for example carbon epoxy fibers. These fibers are woven and then cut, for example by manual cutting or water-jet cutting, so as to obtain a preform that has substantially the dimensions of the final blade to be obtained.

At the end of this cutting operation, the preform 12 comprises at least one edge 18, at least one segment 19 of which comprises free fibers 21, for example unmeshed fibers that extend from this edge in random directions and along random lengths. The free fibers have been shown only in FIG. 4, schematically and in a way which does not limit the invention.

The preform 12 is then for example subjected to a first compression.

As illustrated in FIG. 1, in a conventional RTM method, in an open position of the mold 10, the preform 12 is deposited in a cavity 20 formed in a bottom part 22 of the mold 10. The cavity 20 determines a bottom part 23 of a pattern corresponding to the final component to be obtained, that is to say, in the present case, a turbine-engine blade.

In FIG. 1, and in the following FIGS. 2 and 3 of the present description, the preform 12 is shown with a clearance that is deliberately visible with respect to the pattern 23 of the mold 10, for reasons of visibility and legibility of these figures and in order to clearly distinguish the preform 12 from the mold 10. However, it will be understood that in reality this clearance is notional, the preform following the shape of the pattern 23.

Then a top part 24 of the mold 10 is closed on the part 22, and in doing this a principal face 26 of the top part 24 effects a second compression of the preform 12. The mold 10 then occupying a closed position, the pattern 23 is put under vacuum.

Then a resin is injected, for example an epoxy resin, into the cavity 20, so that it impregnates the fibers of the preform 12 and covers them, and then this resin is allowed to polymerize so as to obtain a highly rigid component. The mold 10 is then opened by removing the top part 24 in order to remove the final component from the mold.

As can be seen in FIG. 1, the edge 18 of the preform 12 is situated in the vicinity of the lateral edges 28 of the cavity 20 and more particularly its segment 19 comprising the free and/or unmeshed fibers is situated in the vicinity of at least one parting line 30 joining the bottom 22 and top 24 parts of the mold 10.

This parting line 30 is particularly liable to receive free fibers extending from the segment 19 of the edge 18 of the preform 12, and for this reason the mold 10 according to the prior art comprises a recess 32 containing the parting line 30, formed between the bottom part 22 and the top part 24, which is able to accommodate the free and/or unmeshed fibers of the segment 19 in order to prevent them from being interposed at the plane of the parting line 30 between the bottom 22 and top 24 parts and from risking to interfere with the closure of the mold 10. This is because, if free fibers came to be interposed between the bottom 22 and top 24 parts of the mold 10, they could lead to faulty closure of the mold, thus causing leakages of resin and the appearance of defects on the final component.

The recess 32 is for example delimited by bevels 34, 36, referred to as anti-pinch bevels, which are formed facing each other in the bottom 22 and top 24 parts of the mold 10.

FIG. 1 shows a mold 10 comprising two transversely opposite recesses 32, but it will be understood that the presence of the recesses 32 in the mold 10 depends directly on the configuration of the mold 10 and of the preform 12 that is associated with the mold 10. More particularly, the presence of recesses depends on the configuration of the edges 18 of the preform 12, the recesses 32 being provided facing each segment 19 liable to contain free fibers, and on the other hand not being necessary when the edges 18 of the preform 12 do not contain free fibers.

In this configuration, it will be understood that the recesses 32 form preferential paths through which the resin, when it is injected into the mold 10 in the liquid state, travels by passing round the preform 12, since it does not encounter any resistance in these recesses 32.

This passing round is detrimental to the obtaining of a final component with satisfactory porosity since it causes a movement of the resin in the mold 10 in the form of pockets where the resin is absent, which may after removal from the mold leave cavities in the form of bubbles, generally of small size, on the surface of the preform 12, which in the end leads to the obtaining of a final component with high porosity having mechanical characteristics inferior to those required.

To remedy this drawback, the invention proposes a mold assembly comprising an injection mold 10 and an element 38 for said injection mold 10 allowing preventing the trapping of free fibers while avoiding using anti-pinch bevels 32, 34, in order to prevent the resin passing round the preform 12. This element 38 thus allows assisting the progress of the resin in the mold 10 along a uniform propagation front. Such a propagation front allows to fill the mold 10 without forming pockets where the resin would be absent as the resin progresses inside it, which allows to limit the appearance of cavities in the form of bubbles in the resin once it is solidified, and consequently to obtain a final component of satisfactory quality.

Figure 2:
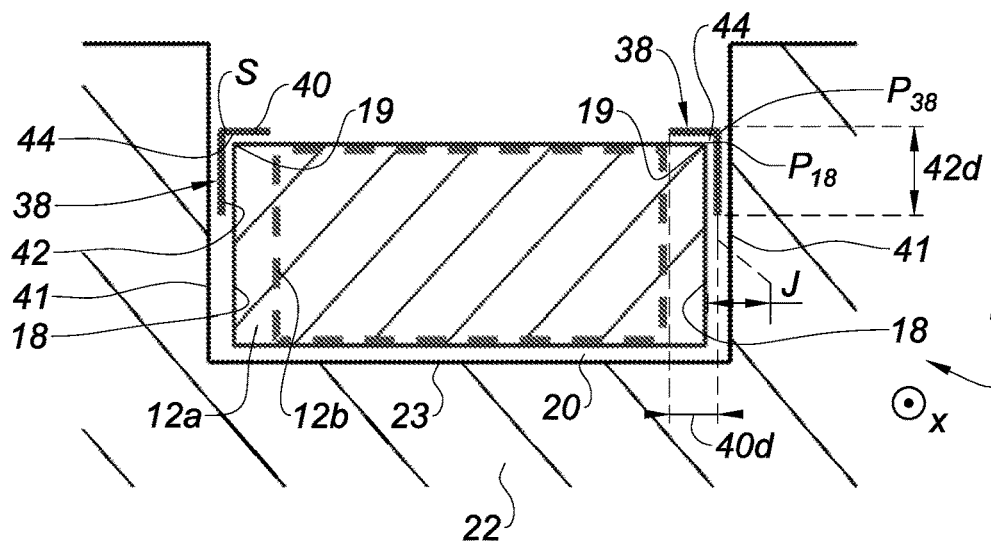
FIG. 2 is a schematic view in cross section of a mold assembly and of a preform according to the invention shown during a step of depositing the preform prior to the closure of the mold of said mold assembly.
Figure 3:
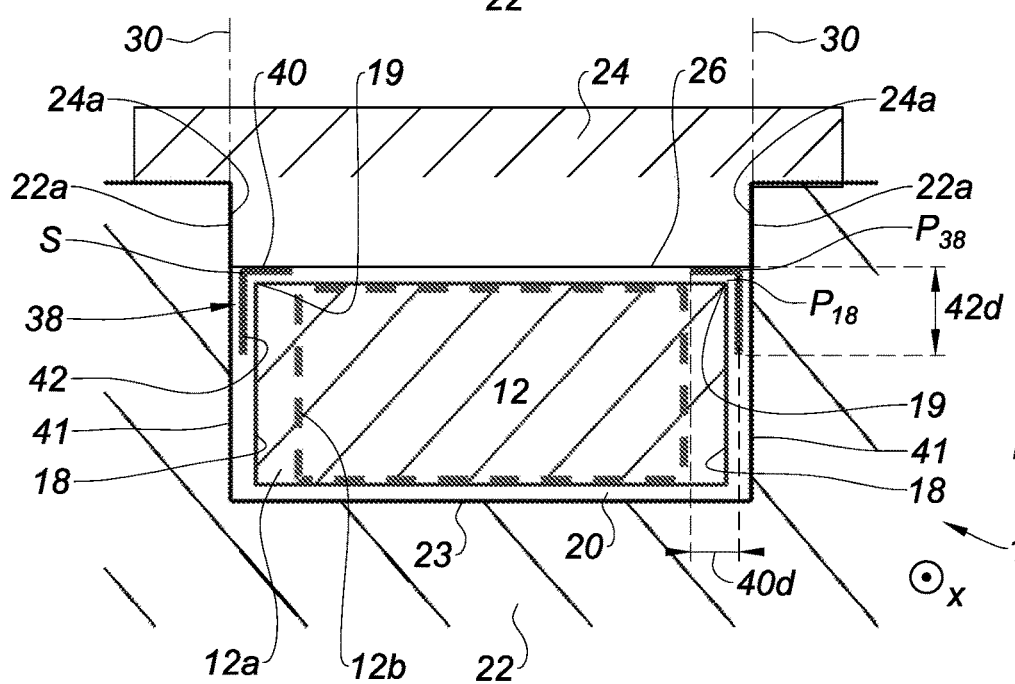
FIG. 3 is a schematic view in cross section of a mold assembly and of a preform according to the invention shown during a step of closure of the mold of the mold assembly prior to the injection of resin into said mold.

Such a mold assembly comprising such a mold 10 and such an element 38 has been shown in use in FIGS. 2 and 3.

As can be seen in FIG. 2, in the same way as before, the injection mold 10 according to the invention is intended to receive a preform 12 of principal direction X and for this purpose comprises a cavity 20 formed in a bottom part 22 of the mold 10. The cavity 20 determines as before a bottom part 23 of a pattern corresponding to the final component to be obtained. As illustrated by FIG. 3, the mold 10 comprises a top part 24, a principal face 26 of which is designed to be closed on the bottom part 22.

The mold 10 shown in FIGS. 2 and 3 comprises joint faces 30, the orientation of which differs from that in FIG. 1, but this configuration in no way limits the invention.

FIGS. 2 and 3 show a preform 12, segments 19 of which are liable to have free and/or unmeshed fibers, but it will be understood that this configuration does not limit the invention and that the preform 12 may comprise a smaller or larger number of segments 19 of this type.

The element 38 according to the invention is removable, is adapted to the preform 12 and is conformed as a profiled member that is intended to be arranged in the mold 10 along at least each segment 19 of the edge 18 of the preform 12 in order to prevent the trapping of the free and/or unmeshed fibers of the segment 19. The mold 10 does not comprise any recess and/or anti-pinch bevels and because of this the resin, when it flows, is not inclined to pass round the preform 12 and can expand uniformly in the pattern 23.

Figure 5:
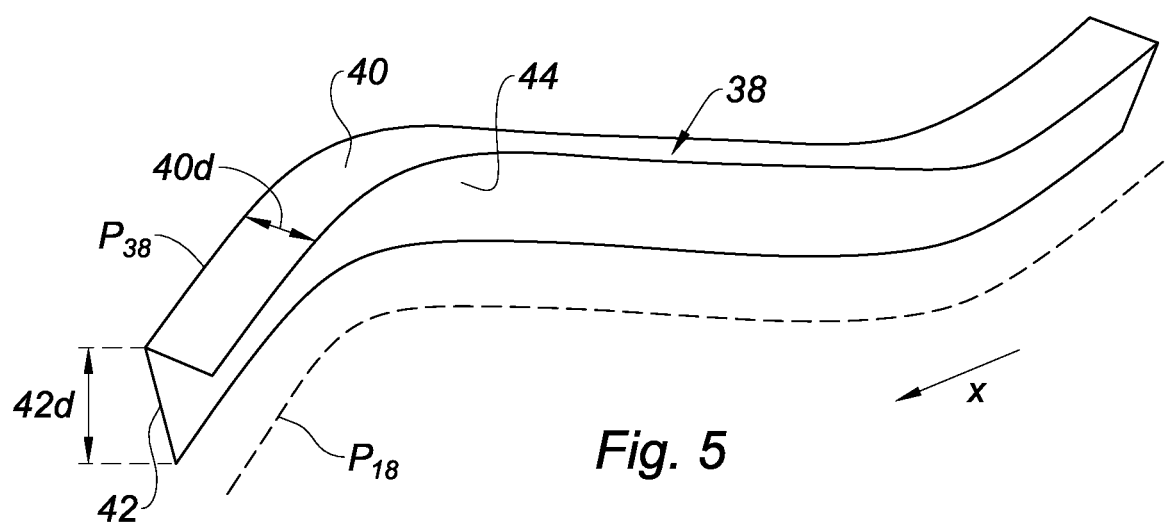
FIG. 5 is a perspective view of a removable element according to the invention.

In the preferred embodiment of the invention that has been shown in FIGS. 2, 3 and 5, the element 38 has a cross section S in the form of an L and comprises two walls 40, 42, one of which, in this case the wall 42, is configured so as to be placed in contact with a wall 41 of the bottom part 22 of the mold before closure thereof, as illustrated by FIG. 2.

The cross section S, transverse with respect to the principal direction X, delimits a concavity 44 configured so as to be turned towards the edge 18 of the preform. Secondarily, this cavity 44 delimits a flow path between the cross section S and the edge 18 of the preform 12.

As illustrated in FIG. 2, the preform 12 comprises at least one first part 12a comprising the edge 18, which is intended to be removed by machining after impregnation and polymerization of said preform 12, and at least one second part 12b, shown in broken lines in FIGS. 2 and 3, which is intended to form a final component.

Another feature of the invention is that each wall 40, 42 is configured so as to extend on either side of the edge 18 of the preform along a minimum distance 40d, 42d able to contain free fibers of the segments 19 of the preform 12 extending from the edge 18. Thus it will be understood that the minimum distances 40d, 42d depend on the maximum size that the fibers that extend from the segment 19 of the edge 18 are liable to have, the size of these fibers depending directly on the cutting method used to obtain the preform 12 from the fiber fabric.

Moreover, the element 38 is configured so as to cooperate with the preform 12 so that the element 38 does not extend opposite the part 12b of the preform. Thus the distance 40d is configured so as to extend only facing said first part 12a, that is to say not to exceed the length of the part 12a intended to be removed by machining after impregnation of the preform 12. Thus the element 38 can be removed with the first part 12a, not leaving any of its parts facing the second part 12b forming the final component.

Moreover, the removable element 38 is advantageously configured so as to substantially follow a profile of the edge 18 of the preform 12. This is because the removable element 38 extends substantially along the longitudinal direction X but is preferably configured so that a profile P38 of its walls 40, 42 follows a profile P18 of the edge 18 of the preform 12. In the simple configuration shown in FIGS. 2 and 3, the profile P38 is substantially rectilinear and parallel to the principal direction X.

However, in the case of a preform 12, the edge 18 of which has a more complex profile P18 as shown in broken lines in FIG. 5, the profile P38 of the element 38 extends roughly along the direction X but follows precisely the profile P18.

It will be understood that the removable element 38 preferably does not extend along the entire length of the edge 18 of the preform 12, but preferably only along the segment 19 comprising free fibers 21.

In this configuration, the removable element 38 is, as illustrated by FIGS. 2 and 3, configured so as to be arranged substantially at the edge of the pattern 23. Moreover, as illustrated by FIG. 3, the removable element 38 is configured so as to be disposed at the joint planes 30 providing the junction of the bottom 22 and top 24 parts of the mold 10. More particularly, the bottom part 22 comprises first faces 22a and the top part comprises second faces 24a able each to cooperate with a corresponding first face 22a of the bottom part 22. The first and second faces 22a, 24a are configured so as to be arranged in contact with each other along the whole of their surfaces on the joint planes 30 in the closed position of the mold 30.

The removable element 38 is configured so as to be disposed in contact with the walls 41 of the pattern 23 and at the joint planes 30 providing the junction of the bottom 22 and top 24 parts of the mold 10.

Such a mold assembly comprising such a removable element 38 no longer requires having a mold 10 a cavity intended to receive the free and/or unmeshed fibers of the preform 12, since the element 38 provides the confinement of these fibers in its concavity 44. The free fibers consequently no longer risk being introduced between the faces 22a, 24a of the bottom part 22 and top part 24 of the mold 10 when it closes.

The use of such a removable element allows, as a consequence, designing a simplified mold 10.

Figure 6:
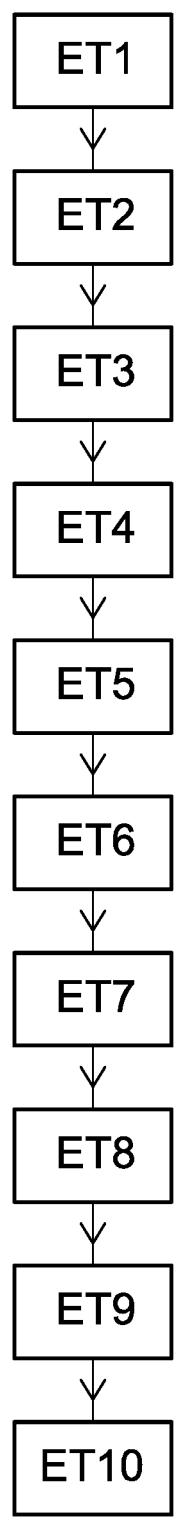
FIG. 6 is a block diagram showing the steps of a method for manufacturing a turbine-engine component according to the invention.

In this configuration, a turbine-engine component made from composite material can be obtained according to a method shown in FIG. 6, using a mold assembly comprising a mold 10 and an element 38 of the types described above. Successive steps of this method are described below.

During a step ET1, a three-dimensional weaving of fibers is carried out. Then, during a step ET2, the weave is cut in order to obtain a preform 12 of the type shown in FIG. 4, corresponding substantially to the final component to be obtained. At the end of the step ET2, the preform 12 comprising at least one edge 18 including at least one segment 19 comprises free and/or unmeshed fibers.

Then the preform 12 is deposited in the cavity 20 in the bottom part 22 of the mold 10 during a step ET3.

Then, during a step ET5, one or more removable elements 38 are deposited along the segments 19 of the corresponding edges 18 of the preform 12, at the edge of the pattern 23, as shown in FIG. 2, and at the joint face 30 shown in FIG. 3, that is to say with their walls 42 placed in contact with the walls 41 of the bottom part 22 of the mold 10. The fibers issuing from the segment 19 of the edge 18 of the preform 12 are then contained in the cavity 44 of the removable element or elements 38.

Then, during a step ET6, the top part 24 of the mold 10 is closed on the bottom part 22. The walls 40, 42 of each element 38 are placed respectively in contact with the wall 41 of the bottom part 22 of the mold 10 and the facing wall of the top part 24 of the mold 10.

It is then possible, during a step ET7, to inject the resin into the cavity 20. The resin then polymerizes during a seventh step ET8, until a block comprising the preform 12 and the removable elements 38 trapped in the polymerized resin is obtained. During a step ET9, the preform 12 and the element or elements 38 trapped in the polymerized resin are extracted, and then, during a step ET10, the preform 12 is machined so that the removable element or elements 38 trapped in a first part 12a are eliminated with this first part 12a in order to obtain the final component corresponding to the second part 12b.

It goes without saying that the elements 38 are preferably not manufactured to measure before each molding operation but form part of a stock made available to the operator responsible for the molding. Thus, prior to the step ET5 of depositing the removable element 38, said removable element 38 is, during a step ET4, chosen from a stock of removable elements 38 made available to the operator responsible for the molding. During this operation, the element 38 is chosen so that a profile P38 of the profiled member of said removable element 38 follows the profile P18 of the edge 18 of the preform 12 along its segment 19 and along the entire length of the profiled member.

During this step ET4, the element 38 is also chosen so that the walls 40, 42 of the profiled member of the removable element 38 extend on either side of the edge 18 of the preform 12 along a minimum distance 40d, 42d able to contain the free and/or unmeshed fibers of the segment 19, and so that these walls 40, 42 of the profiled member of the removable element 38 extend only in line with said first part 12a of the preform 12.

The choice of the adaptable removable elements 38 can advantageously be limited by using removable elements produced from a flexible material such as silicone, which is able to have a flexible profile P38 able to adapt to a plurality of different preform profiles P18.

The invention therefore makes it possible to substantially improve the RTM method for molding turbine-engine components made from composite materials and to reduce the degree of scrapping of such components.

While illustrative embodiments have been illustrated and described, it will be appreciated that various changes can be made therein without departing from the spirit and scope of the invention.

The invention claimed is:

1. A mold assembly comprising an injection mold having at least two parts, the mold configured to move between an open position in which said at least two parts are separated to allow the introduction of a preform in its entirety into a cavity of the at least one of said two parts, and a closed position in which said at least two parts are joined along a parting line to allow the impregnation of said preform with a resin injected into said mold, and then the polymerization of the resin impregnating said preform, said preform extending in a given principal direction, comprising at least one edge extending substantially along said principal direction in a vicinity of lateral edges of the cavity, and said edge comprising at least one segment from which there project free fibers liable to lie in the parting line of said two parts of said mold when it occupies its closed position, and at least one longitudinal element adapted to said injection mold, wherein said at least one longitudinal element is removable, configured so as to cooperate with the preform and conformed as a profiled member, and configured so as to be arranged in contact with said mold along at least said segment of said edge of the preform in order to prevent the pinching of the free fibers of said segment of said edge of the perform between said at least two parts of said mold, wherein the mold comprises a bottom part comprising a pattern configured so as to receive the preform and comprising at least a first mold closure face, a top part configured so as to close the bottom part and comprising at least one second mold closure face able to cooperate with the first face, said first and second faces being configured so as to be arranged in contact with each other along the whole of their surfaces along said at least one parting line in the closed position of the mold, and wherein said at least one removable element is configured so as to be disposed in contact with a wall of the pattern and at said parting line providing a junction of the bottom and top parts of the mold.

2. The mold assembly according to claim 1, wherein said at least one longitudinal element has an L-shaped cross section and comprises a wall that is configured so as to be placed in contact with a wall of one of the at least two parts of the mold before the mold is closed and a wall that is configured so as to be arranged in contact with a facing wall of another of the at least two parts of the mold when the mold is closed.

3. The mold assembly according to claim 2, wherein the walls of said at least one longitudinal element are configured so as to extend on either side of the edge of the preform at a minimum distance able to contain the free fibers of said segment of the edge of the preform projecting from said segment.

4. The mold assembly according to claim 2, wherein said at least one longitudinal element is configured so as to cooperate with a preform comprising at least a first part comprising said edge, intended to be removed by machining after polymerization of said preform, and at least a second part intended to form a final component, and in that the walls of said at least one longitudinal element are configured so as to extend only facing said first part.

5. The mold assembly according to claim 1, wherein the edge of the perform has a given profile and in that a profile of said at least one longitudinal element configured as a profiled member follows the profile of the edge of the preform along the entire length of said at least one longitudinal element.

6. A manufacturing method for manufacturing a turbine-engine component made from composite material by impregnating a woven preform with a resin with a mold assembly according to the claim 1, characterized in that the method comprises successively:
   a step during which a three-dimensional weaving of fibers is carried out;
   a step during which the weave is cut in order to obtain a preform corresponding substantially to the component to be obtained, said preform comprising at least one edge, at least one segment of which comprises free fibers;
   a step during which the preform is deposited in the pattern in the bottom part of the mold;
   a step during which at least one longitudinal element, which is removable, is deposited in contact with a wall of the pattern along at least said segment of the edge of the preform and at the parting line of the mold providing the junction of its bottom and top parts;
   a step during which the top part of the mold is closed on the bottom part;
   a step during which resin is injected into the mold;
   a step of polymerization of the resin;
   a step during which the preform and the at least one longitudinal element trapped in the polymerized resin are extracted; and
   a step during which a first part of the preform containing the at least one longitudinal element trapped in the polymerized resin is machined in order to eliminate said at least one longitudinal element and any excess resin in order to keep only a second part of the preform corresponding to the final component.

7. The manufacturing method according to claim 6, wherein the walls of said at least one longitudinal element are configured so as to extend on either side of the edge of the preform at a minimum distance able to contain the free fibers of said segment of the edge of the preform projecting from said segment, and wherein said at least one longitudinal element is configured so as to cooperate with a preform comprising at least a first part comprising said edge, intended to be removed by machining after polymerization of said preform, and at least a second part intended to form a final component, and in that the walls are configured so as to extend only facing said first part, and wherein the edge of the perform has a given profile and in that a profile of said profiled member follows the profile of the edge of the preform along the entire length of said profiled member, the method comprising, prior to the step of depositing the removable element, a step during which said at least one longitudinal element is chosen from a stock of removable elements so that:
   a profile of the profiled member of said at least one longitudinal element follows the profile of the edge of the preform along the entire length of said profiled member,
   the walls of the profiled member of said at least one longitudinal element are configured to extend on either side of the edge of the preform along a minimum distance able to contain the free fibers of said segment of the preform extending from said segment, and the walls of the profiled member of said at least one longitudinal element are configured to extend only in line with said first part of the preform.

8. A mold assembly comprising an injection mold having at least two parts, the mold configured to move between an open position in which said at least two parts are separated to allow the introduction of a preform into at least one of said parts, and a closed position in which said at least two parts are joined along a parting line to allow the impregnation of said preform with a resin injected into said mold, and then the polymerization of the resin impregnating said preform, said preform extending in a given principal direction, comprising at least one edge extending substantially along said principal direction, and said edge comprising at least one segment from which there project free fibers liable to lie in the parting line of said two parts of said mold when it occupies its closed position, and at least one longitudinal element adapted to said injection mold, wherein said at least one longitudinal element is removable, configured so as to cooperate with the preform and conformed as a profiled member, and configured so as to be arranged in contact with said mold along at least said segment of said edge of the preform in order to prevent the pinching of the free fibers of said segment of said edge of the perform between said at least two parts of said mold, wherein said at least one longitudinal element has an L-shaped cross section and comprises a wall that is configured so as to be placed in contact with a wall of one of the at least two parts of the mold before the mold is closed and a wall that is configured so as to be arranged in contact with a facing wall of another of the at least two parts of the mold when the mold is closed.

9. The mold assembly according to claim 8, wherein the walls of said at least one longitudinal element are configured so as to extend on either side of the edge of the preform at a minimum distance able to contain the free fibers of said segment of the edge of the preform projecting from said segment.

10. The mold assembly according to claim 8, wherein said at least one longitudinal element is configured so as to cooperate with a preform comprising at least a first part comprising said edge, intended to be removed by machining after polymerization of said preform, and at least a second part intended to form a final component, and in that the walls of said at least one longitudinal element are configured so as to extend only facing said first part.

11. A mold assembly comprising an injection mold having at least two parts, the mold configured to move between an open position in which said at least two parts are separated to allow the introduction of a preform into at least one of said parts, and a closed position in which said at least two parts are joined along a parting line to allow the impregnation of said preform with a resin injected into said mold, and then the polymerization of the resin impregnating said preform, said preform extending in a given principal direction, comprising at least one edge extending substantially along said principal direction, and said edge comprising at least one segment from which there project free fibers liable to lie in the parting line of said two parts of said mold when it occupies its closed position, and at least one longitudinal element adapted to said injection mold, wherein said at least one longitudinal element is removable, configured so as to cooperate with the preform and conformed as a profiled member, and configured so as to be arranged in contact with said mold along at least said segment of said edge of the preform in order to prevent the pinching of the free fibers of said segment of said edge of the perform between said at least two parts of said mold, wherein the edge of the perform has a given profile and in that a profile of said at least one longitudinal element configured as a profiled member follows the profile of the edge of the preform along the entire length of said at least one longitudinal element.

\* \* \* \* \*

UNITED STATES PATENT AND TRADEMARK OFFICE
CERTIFICATE OF CORRECTION

PATENT NO. : 10,994,504 B2
APPLICATION NO. : 15/599061
DATED : May 4, 2021
INVENTOR(S) : Techer et al.

It is certified that error appears in the above-identified patent and that said Letters Patent is hereby corrected as shown below:

In the Claims

| Column | Line | |
|---|---|---|
| 9 | 32, 33 | change "the perform" to -- the preform -- |
| 10 | 2 | change "the perform" to -- the preform -- |
| 10 | 52 | change "the perform" to -- the preform -- |
| 11 | 23 | change "the perform" to -- the preform -- |
| 12 | 30 | change "the perform" to -- the preform -- |
| 12 | 31 | change "the perform" to -- the preform -- |

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*